May 1, 1928.

F. D. CARPENTER 1,668,395

SHAFT LOCK FOR AUTOMOBILES

Filed May 24, 1926

Inventor
Frank D. Carpenter

By

Attorney

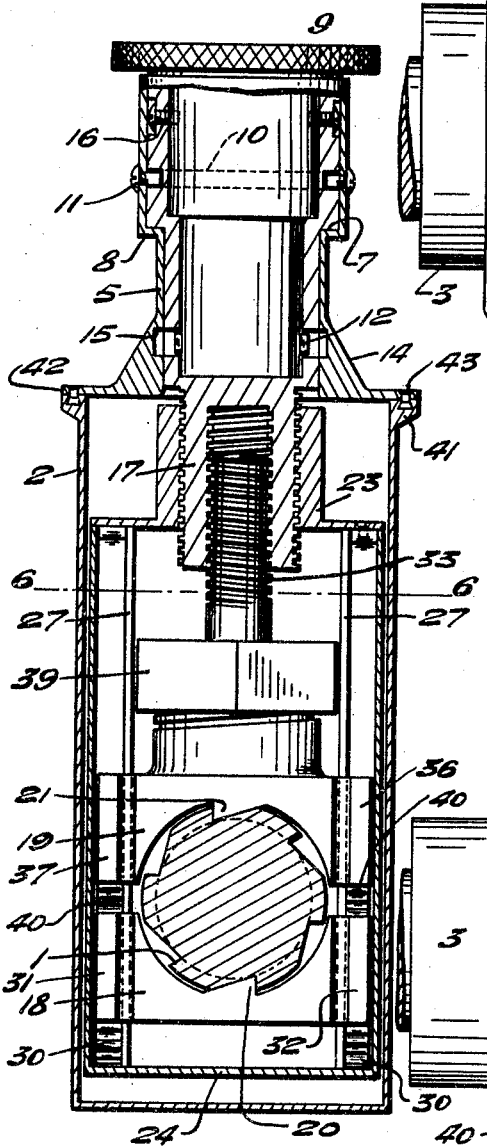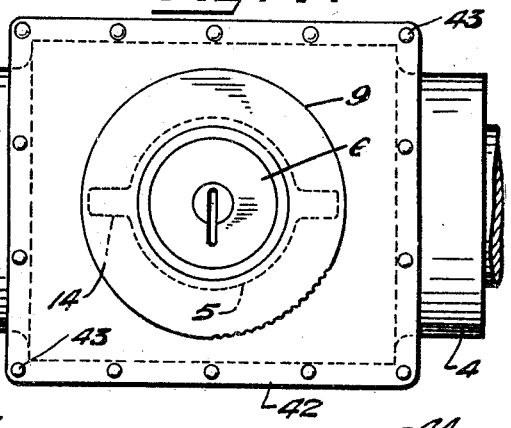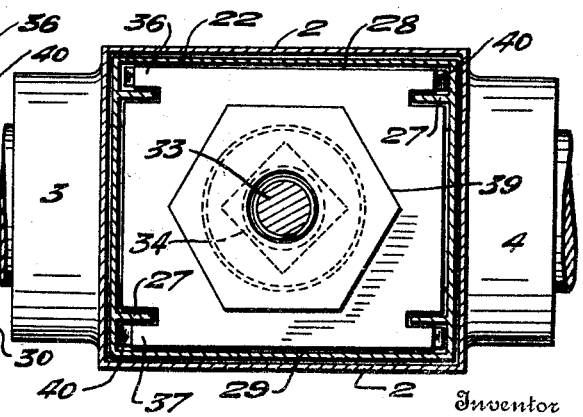

Patented May 1, 1928.

1,668,395

UNITED STATES PATENT OFFICE.

FRANK D. CARPENTER, OF CONCORD, NEW HAMPSHIRE, ASSIGNOR, BY MESNE ASSIGNMENTS, OF ONE-HALF TO ARTHUR H. HOUGH, OF CONCORD, NEW HAMPSHIRE.

SHAFT LOCK FOR AUTOMOBILES.

Application filed May 24, 1926. Serial No. 111,344.

This invention relates to shaft locks for auto vehicles and has for its principal object the provision of a theft-foil device which makes it impossible for a car to be towed away in a forward direction when the device is locked. It is impracticable to tow an automobile backwards on account of the difficulty in making the steering wheels track with the rear wheels, so that an auto vehicle equipped with the shaft lock of the present invention may be considered fully safe guarded against illicit removal.

Another object of the invention is the construction of a shaft lock which is inviolable by the tools ordinarily carried by one who might wish to tamper with it.

Still another object of the invention is to provide shaft locking means that are simple in construction, positive in action and not easily put out of order.

Other objects of the invention will appear as the following description of a preferred embodiment thereof proceeds.

In the drawings:—

Figure 3 is a view similar to that of Figure 1 showing the parts in locked position.

Figure 4 is a plan view of the device.

Figure 5 is a perspective view showing one corner of the carriage which elevates the lower jaw of the lock.

Figure 6 is a section taken along the line 6—6 of Figure 3.

Figure 1:
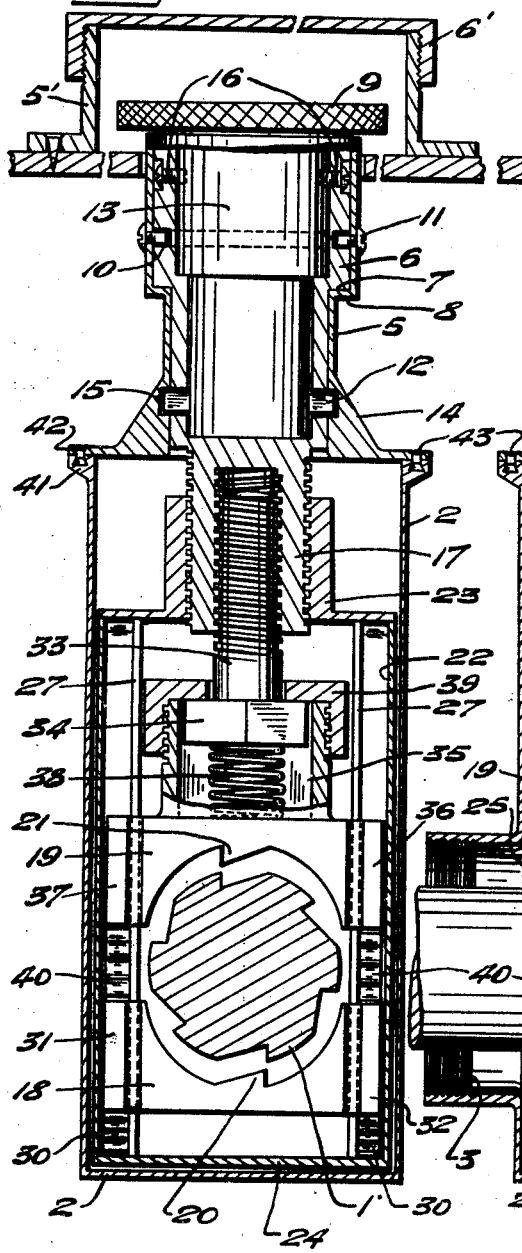
Figures 1 and 2 are, respectively end and side sectional views taken in a vertical plane, showing the parts in unlocked position.
Figure 2:
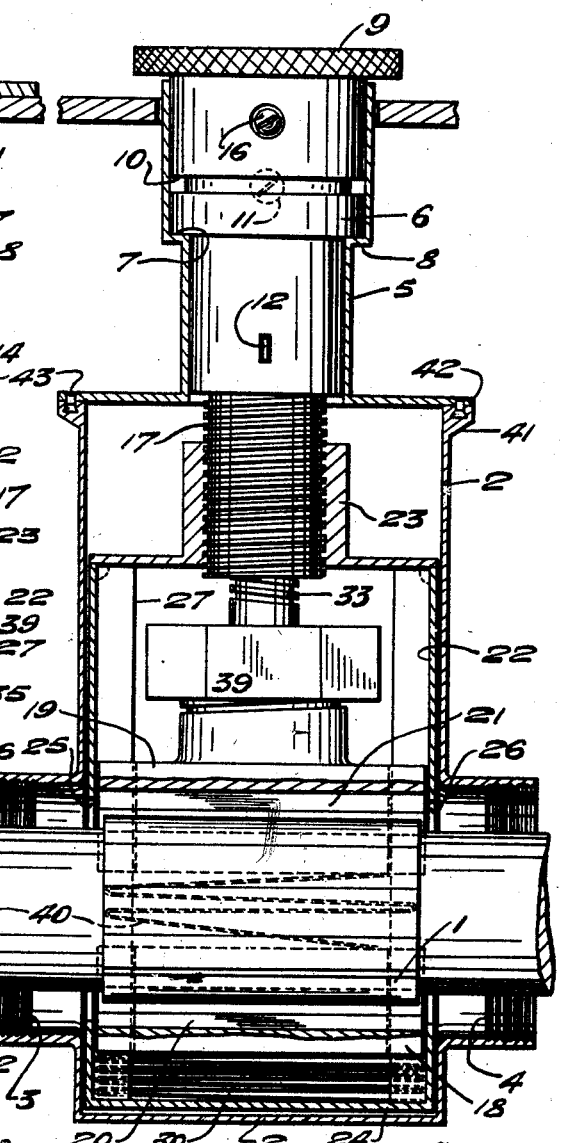

This locking device is designed to interengage the drive shaft of the auto vehicle at some point beyond the clutch, so as to lock the rear wheels against forward movement without interfering with the operation of the engine or clutch. Its use presupposes the provision in the auto vehicle of a special drive shaft, installed when the vehicle is built or provided later, having a portion thereof formed with teeth indicated by the reference character 1 in Figures 1 and 3, having abrupt shoulders facing in the direction of forward rotation of the drive shaft, and gradually sloping shoulders facing in the opposite direction. The outer casing 2 of the locking device is intended to be slipped over the drive shaft and to occupy a position in the zone of the toothed portion of said drive shaft. It is preferably formed with threaded nipples 3 and 4 at its opposite ends into which the divided portions of the torque tube, not shown, are screwed, so that the torque tube and the outer casing of the locking mechanism constitute one unitary member. The locking mechanism, by reason of its position relative to the drive shaft, is beneath the floor of the passenger compartment in a touring car or in a similar position in other types of auto vehicles and the cover 5 of the outer casing is formed as a neck which projects through an opening in the passenger compartment. The outer casing, being in fixed position by virtue of its connection to the torque tube, and passing through a hole in the floor-boards in the passenger compartment, needs no especial fastening device in the passenger compartment for holding it in place. In fact, since the body of the auto vehicle is carried by the vehicle springs while the torque tube is not, there will be relative reciprocating movement of lock and floor boards that precludes the use of fastening means. A sleeve 6 is seated within the cover 5, being preferably formed with a shoulder 7 rotatable on a corresponding shoulder 8 formed in the cover. The upper end of the sleeve is provided with a knurled flange 9 exposed adjacent the floor of the passenger compartment and by means of which the sleeve 6 may be rotated. A closure consisting of the flanged section 5' which fastens to the floor, and a cap section 6', encloses the projecting knurled end of the sleeve 6 and allows room for the reciprocating movements of the lock relatively to the floor boards. Said sleeve is formed with an annular groove 10 into which projects screws 11 introduced through the cover, said groove and screws preventing endwise removal of the sleeve 6. These screws are the only fastening devices of like character exposed externally of the lock and their illicit removal would be of no advantage since the keepers 12 of the tumbler lock 13 which occupies the chamber within the upper part of the device are in locking position locked. The lower portion of the cover 5 is made massive, as indicated at 14 in order to make room for the internal recesses 15 into which the keepers 12 protrude. The tumbler lock is held in place by means such as screws 16, the heads of the latter being countersunk and sealed within the wall of the neck portion of the cover 5.

The inner end of the sleeve 6 is formed as a tubular rod 17 threaded inside and out, preferably with square cut threads. This tubular rod operates the jaws 18 and 19 of the lock through instrumentalities which will presently be described. It should first be noted, however, that the jaws 18 and 19 are each provided with a tooth 20 and 21, respectively, engageable with the teeth on opposite sides of the drive shaft when said jaws are brought together, so that the drive shaft may not rotate in a forward direction, due to the abutting of the abrupt faces of the respective teeth on the drive shaft and jaws, but may rotate in a reverse direction due to the riding of the sloping faces of the teeth of one member over those of the other.

A carriage 22 is placed within the casing 2, being slidable therein and non-rotatable on account of the corresponding polygonal shape of said casing and carriage, as shown in Figure 6. It is, of course, within the spirit of the invention to make the casing and carriage of any desired shape, and if necessary, to provide other means for rendering these members non-rotatable. Said carriage has a top 23 suitably secured to the carriage by means such as the screws 44, said top having an internally screw-threaded sleeve engaging the external threads of the rod 17. When said rod is rotated in one direction it therefore elevates the carriage, and, when it is rotated in the opposite direction, it depresses the carriage. The carriage has a bottom wall 24 adjacent the bottom of the casing 2 and is formed with lateral apertures 25 and 26 of sufficiently greater diameter than the drive shaft 1 to allow for the necessary sliding movement of the carriage.

The carriage 22 is formed at its ends with upright ribs 27 extending substantially throughout its height and forming T-shaped recesses 28 and 29 at opposite sides of the carriage. A flat spring 30 bent zigzag-fashion rests in the bottom of each of these recesses and the jaw 18 of the lock is positioned adjacent the floor of the carriage, said jaw having T-shaped projections 31 and 32 extending into the recesses 28 and 29 and resting upon the springs 30, so that the jaw 18 is resiliently supported. When the carriage rises under compulsion of rotary movement imparted to the rod 17, the jaw 18 is moved upwardly by the springs 30 into contact with the drive shaft. If the teeth on the jaw and drive shaft are in proper registry said jaw and drive shaft are thus placed positively in interengagement, but if the point on one tooth happens to abut against the back of the other tooth then the spring 30 is compressed so that the jaw 18 remains under such tension that, upon slight movement of the drive shaft in a forward direction at any time subsequent to the locking of the device, the jaw will spring into interengagement with the shaft as soon as the respective teeth come into registry.

The upper jaw 19 is operated through a bolt 33 engaging the interior threads of the rod 17. Said bolt has a square head 34 held against rotation by being within the polygonal bore of a socket 35 formed upon the upper jaw 19. Said jaw is provided with projections 36 and 37 similar to the projections 31 and 32 of the jaw 18 and extending into the recesses 28 and 29. A spring 38 is housed within the socket 35 between the bolt head and jaw 19 and forms a resilient cushion for said jaw. When the rod 17 is rotated, the bolt 33 moves downwardly simultaneously with the upward movement of the carriage 22. This movement lowers the jaw 19 into engagement with the drive shaft, but if the point of the tooth 21 should by chance rest upon the back of one of the teeth of the drive shaft, then the spring 38 becomes compressed, holding the jaw 19 under tension, while the device is locked, until such time as the drive shaft may be moved slightly forward, whereupon the tooth 21 will spring into interengaged position with the cooperating tooth of the drive shaft. When the knurled knob 9 is turned to release the jaws, the reverse movement of the rod 17 will draw up the bolt 33 and lower the carriage 22. The socket 35 is exteriorly screw-threaded and engaged by a cap 39 which surrounds the shank of the bolt 33 and imprisons the head 34 of said bolt so that the jaw 19 may be positively drawn upward out of engagement with the drive shaft. A light spring 40 arranged in the recesses 28 and 29 between the jaws 18 and 19 prevents the lower jaw from being bounced into contact with the drive shaft by road vibrations.

It will be noted that in the construction of my improved shaft lock it has been kept in mind to so construct the casing 2 as to render it inaccessible to the tools ordinarily employed for breaking open locks. To this end I have formed the casing 2 with a massive flange 41 at its upper end, over which the flange 42 of the cover 5 extends. The flange 41 is formed with undercut rivet recesses and the flange 42 with countersunk alining apertures registering with said recesses. Rivets 43 are suitably inserted as shown and mushroomed at their lower ends to fill the undercut recesses. The rivets thus afford no external projections which might be cut off with a cold-chisel.

It is to be understood that while I have provided a shaft lock which prevents the towing of a vehicle in a forward direction, yet it complies fully with the fire ordinances in force in many cities to the effect that a vehicle must be free to be moved in case of emergency, since the present locking device permits the drive shaft to rotate in a reverse direction when the device is locked, the jaws being forced apart by the interengaging sloping surfaces of the respective teeth against the tension of the springs 30 and 38.

Although I have in the present disclosure described the embodiment of my invention as applied to a drive shaft extending in a plane at right angles to the movement of the jaws 18 and 19, it is to be understood that my lock is equally applicable to drive shafts which extend obliquely from the transmission gear to the rear axle, in which case it is necessary only to provide the jaws with teeth correspondingly sloped in order to obtain their correct interengagement with the drive shaft and to correspondingly slope the nipples which receive the ends of the torque tube.

While I have in the above description disclosed what I believe to be a preferred and practical embodiment of my invention, it is to be understood that the specific details described are not limitative in their effect upon the invention but merely illustrative except in so far as they are expressly prescribed by the terms of the appended claims.

Having described my invention what I claim as new and desire to secure by Letters Patent, is:—

1. In combination, a drive shaft and means for locking said drive shaft against rotation in one direction, said means comprising a locking-member movable to and from locking engagement with said shaft, an abutting means movable toward and from said shaft, and resilient means so related to said locking-member and said abutting means as to resist approach of said member to locking engagement with said shaft.

2. In combination, a drive shaft having a toothed zone, the teeth in said zone having abrupt faces directed in the direction of forward movement of said drive shaft and gradually inclined faces directed in the direction of reverse movement of said drive shaft, said drive shaft being adapted to be inclosed in a torque tube, and locking means including a casing unitary with said torque tube, said means including two toothed members engageable with the teeth on said drive shaft to inhibit rotation in a forward direction while permitting rotation in a reverse direction, and resilient means so positioned relatively to said toothed members that each of said members opposes movement of the other toward locking engagement with said shaft.

3. A lock adapted to interengage with a toothed zone of a drive shaft, including a casing surrounding said drive shaft in said toothed zone, having threaded nipples through which said shaft passes, adapted to attach to the divided sections of a torque tube, and locking means housed in said casing engageable with the teeth in said toothed zone.

4. A locking device adapted to interengage with a toothed zone of a drive shaft, including a casing through which said drive shaft passes, opposed jaws within said casing on opposite sides of drive shaft and engageable with the teeth in said zone, and means for positively drawing said jaws into interengagement with said teeth, and means causing each of said jaws to oppose the approach of the other toward said shaft.

5. A locking device adapted to interengage with a toothed zone of a drive shaft, including a casing through which said drive shaft passes, jaws within said casing on opposite sides of said drive shaft and engageable with the teeth in said zone, and means for positively and simultaneously moving said jaws into interengagement with said teeth.

6. A locking device adapted to interengage with a toothed zone of a drive shaft, the teeth in said zone having abrupt faces directed in the forward direction of rotation of said drive shaft and gradually inclined faces directed in the reverse direction of rotation of said shaft, said locking device including a casing through which said drive shaft passes, jaws within said casing above and below said drive shaft having teeth interengageable with the teeth in said zone, operating means for positively and simultaneously drawing said jaws into interengagement with said teeth, and springs between said jaws and operating means, said springs being tensioned by the locking movement of said jaws.

7. A locking device adapted to interengage with a toothed zone of a drive shaft, including a casing through which said drive shaft passes, operating means accessible from without said casing including a hollow member within said casing externally and internally threaded, jaw holding elements engaging, respectively, the external and internal threads of said hollow member, and jaws carried by said elements, one above and one below said drive shaft and interengageable with the teeth thereupon, said jaws being brought together against said drive shaft or retracted therefrom by rotation of said threaded member.

8. A locking device adapted to interengage with a toothed zone of a drive shaft, including a casing through which said drive shaft passes, operatings means accessible from without said casing including a hollow member within said casing externally and internally threaded, jaw holding elements engaging, respectively, the external and internal threads of said hollow member, jaws carried by said elements, one above and one below said drive shaft and interengageable with the teeth thereupon, said jaws being brought together against said drive shaft or retracted therefrom by rotation of said threaded member and a lock for said operating means having the working parts concealed within and protected by said casing.

9. A locking device adapted to interengage with a toothed zone of a drive shaft, including a casing through which said drive shaft passes, operating means accessible from without said casing including a hollow member within said casing externally and internally threaded, jaw-holding elements non-rotatably mounted within said casing and engaging, respectively, the external and internal threads of said hollow member, and jaws carried by said elements, one above and one below said drive shaft and interengageable with the teeth thereupon, said jaws being brought together against said drive shaft or retracted therefrom by rotation of said threaded member.

10. A locking device adapted to interengage with a toothed zone of a drive shaft, including a casing through which said drive shaft passes, operating means accessible from without said casing including a hollow member within said casing externally and internally threaded, jaw-holding elements non-rotatably mounted within said casing and engaging, respectively, the external and internal threads of said hollow member, jaws carried by said elements, one above and one below said drive shaft and interengageable with the teeth thereupon, and means for resiliently supporting said jaws, said jaws being resiliently brought together against said drive shaft or retracted therefrom by rotation of said threaded member.

11. A locking device adapted to interengage with a toothed zone of a drive shaft, the teeth in said zone having abrupt faces directed in the forward direction of rotation of said drive shaft and gradually inclined faces directed in the reverse direction of rotation of said shaft, said locking means including a casing through which said drive shaft passes, operating means accessible from without said casing including a hollow member within said casing externally and internally threaded, a carriage slidably and non-rotatably mounted within said casing engaging the external threads on said hollow member, a jaw resiliently supported within said carriage below said drive shaft and interengageable with the teeth in said toothed zone, an upper jaw slidably and non-rotatably mounted within said carriage and engageable with the teeth on the upper side of said drive shaft, an element engageable with the internal thread on said hollow member and loosely connected to said upper jaw for actuating the same, and a spring between said jaw and element, said jaws being brought together by simultaneous cooperative movement of said carriage and element upon rotation of said hollow member.

12. A locking device adapted to interengage with a toothed zone of a drive shaft, the teeth in said zone having abrupt faces directed in the forward direction of rotation of said drive shaft and gradually inclined faces directed in the reverse direction of rotation of said shaft, said locking means including a casing through which said drive shaft passes, operating means accessible from without said casing including a hollow member within said casing externally and internally threaded, a carriage slidably and non-rotatably mounted within said casing and engaging the external threads on said hollow member, a jaw resiliently supported within said carriage below said drive shaft and interengageable with the teeth in said toothed zone, an upper jaw slidably and non-rotatably mounted within said carriage and engageable with the teeth on the upper side of said drive shaft, an element engageable with the internal thread on said hollow member and loosely connected to said upper jaw for actuating the same, a spring between said jaw and element, said jaws being brought together by simultaneous cooperative movement of said carriage and element upon rotation of said hollow member and a lock for said operating means having the working parts concealed within and protected by said casing.

13. In combination, a drive shaft and means for locking said drive shaft against rotation in one direction, said means comprising a locking-member movable to and from locking engagement with said shaft, an abutting means movable toward and from said shaft, and resilient means so related to said locking-member and said abutting means as to resist approach of said member to locking engagement with said shaft during movement of said abutting means toward said shaft.

14. In combination, a shaft and a shaft-lock comprising a carriage movable relatively to said shaft, a first locking member carried by said carriage and engageable with said shaft by the movement of said carriage in one direction, and a second locking-member movable toward and from said shaft and guided by said carriage.

15. In combination, a shaft and a shaft-lock comprising a carriage movable relatively to said shaft, a first locking member carried by said carriage and engageable with said shaft by the movement of said carriage in one direction, a second locking-member movable toward and from said shaft and guided by said carriage, and means whereby said jaws are caused to oppose each other in their movements toward said shaft.

16. In combination, a shaft having a toothed part, each tooth of which has one face in a plane substantially radial to the shaft and the other face sloping away from said first face and inwardly of the shaft, and a shaft-lock comprising a substantially fixed casing enclosing the toothed part of said shaft, a carriage movable in said casing in a path at right angles to said shaft, a first locking-jaw movable with and in yielding relation to said carriage as the latter moves toward and from said shaft, a second locking-jaw moving under guidance of said carriage toward and from said first locking-jaw on the opposite side of the shaft, and resilient means resisting movement of said jaws toward each other.

17. In combination, a shaft having a toothed part, each tooth of which has one face in a plane substantially radial to the shaft and the other face sloping away from said first face and inwardly of the shaft, and a shaft-lock comprising a substantially fixed casing enclosing the toothed part of said shaft, a carriage movable in said casing in a path at right angles to said shaft, a first locking-jaw movable with and in yielding relation to said carriage as the latter moves toward and from said shaft, a second locking-jaw moving under guidance of said carriage toward and from said first locking-jaw on the opposite side of the shaft, resilient means resisting movement of said jaws toward each other, a driving means, driven means connecting said driving means with said carriage, and driven means resiliently connecting said driving means to said second locking-jaw.

18. In combination, a shaft having a toothed part, each tooth of which has one face in a plane substantially radial to the shaft and the other face sloping away from said first face and inwardly of the shaft, and a shaft-lock comprising a substantially fixed casing enclosing the toothed part of said shaft, a carriage movable in said casing in a path at right angles to said shaft, a first locking-jaw movable with and in yielding relation to said carriage as the latter moves toward and from said shaft, a second locking-jaw moving under guidance of said carriage toward and from said first locking-jaw on the opposite side of the shaft, resilient means resisting movement of said jaws toward each other, a driving means, driven means connecting said driving means with said carriage, driven means resiliently connecting said driving means to said second locking-jaw said driving means operating to move said jaws simultaneously in opposite directions.

In testimony whereof I have hereunto set my hand.

FRANK D. CARPENTER.